US012365395B2

(12) United States Patent
Robinson

(10) Patent No.: US 12,365,395 B2
(45) Date of Patent: Jul. 22, 2025

(54) MULTI-DIMENSIONAL LOAD STRUCTURE

(71) Applicant: Gemini Group, Inc., Bad Axe, MI (US)

(72) Inventor: Mark Robinson, Bad Axe, MI (US)

(73) Assignee: Gemini Group, Inc., Bad Axe, MI (US)

( * ) Notice: Subject to any disclaimer, the term of this patent is extended or adjusted under 35 U.S.C. 154(b) by 479 days.

(21) Appl. No.: 17/700,712

(22) Filed: Mar. 22, 2022

(65) Prior Publication Data
US 2022/0212725 A1 Jul. 7, 2022

Related U.S. Application Data

(63) Continuation-in-part of application No. 17/173,054, filed on Feb. 10, 2021, now Pat. No. 11,535,306, which is a continuation of application No. 16/110,409, filed on Aug. 23, 2018, now Pat. No. 10,926,809.

(51) Int. Cl.
| B62D 33/04 | (2006.01) |
| B62D 25/20 | (2006.01) |
| B62D 29/04 | (2006.01) |
| C03C 17/32 | (2006.01) |
| B32B 3/12  | (2006.01) |
| B32B 17/06 | (2006.01) |

(52) U.S. Cl.
CPC ....... B62D 25/2054 (2013.01); B62D 29/043 (2013.01); B62D 33/046 (2013.01); *B32B 3/12* (2013.01); *B32B 17/065* (2013.01); *B32B 2605/00* (2013.01); *C03C 17/322* (2013.01)

(58) Field of Classification Search
CPC .............. B62D 25/2054; B62D 29/043; B62D 33/046; B32B 3/12; B32B 17/065; B32B 2605/00; B32B 3/28; B32B 5/024; B32B 5/245; B32B 7/12; B32B 2255/02; B32B 2255/26; B32B 2266/0278; B32B 7/022; B32B 21/10; B32B 27/12; B32B 2262/101; B32B 2419/00; B32B 2479/00; B32B 1/00; C03C 17/322; B29D 99/0089; B60R 19/34
USPC ............................ 296/186.5, 184.1; 428/116
See application file for complete search history.

(56) References Cited

U.S. PATENT DOCUMENTS 4,626,023 A   12/1986   Lutz
5,002,334 A    3/1991   Meiler et al.
(Continued)

FOREIGN PATENT DOCUMENTS

CN   109789640 A  *  5/2019  ............. B29C 65/08
EP    1524175 A2  *  4/2005  ........... B29C 70/088
(Continued)

OTHER PUBLICATIONS

Plastics Today Staff, Honeycomb structure car roof boasts class-A finish, Aug. 13, 2015 (Year: 2015).
European Search Report, EP22182562, dated Oct. 6, 2022.

*Primary Examiner* — Amy R Weisberg
(74) *Attorney, Agent, or Firm* — Brooks Kushman P.C.

(57) ABSTRACT

A load structure may include a first honeycomb layer, a second honeycomb layer, and a plurality of intermediate layers. The plurality of intermediate layers may be disposed between the first and second honeycomb layers. The intermediate layers may include one or more adhesive layers, a fiberglass layer, and a paper layer.

17 Claims, 8 Drawing Sheets

(56) References Cited

U.S. PATENT DOCUMENTS

| | | | |
|---|---|---|---|
| 5,079,055 A * | 1/1992 | Doyle | B29C 70/865 |
| | | | 411/908 |
| 5,518,796 A * | 5/1996 | Tsotsis | B32B 27/42 |
| | | | 428/116 |
| 5,589,243 A * | 12/1996 | Day | B29C 44/5654 |
| | | | 428/56 |
| 5,667,866 A * | 9/1997 | Reese, Jr. | B32B 5/26 |
| | | | 428/116 |
| 6,054,200 A * | 4/2000 | Woods | B32B 37/146 |
| | | | 428/116 |
| 6,474,729 B2 | 11/2002 | Patz et al. | |
| 7,017,981 B2 | 3/2006 | Strohmavr et al. | |
| 7,128,365 B2 | 10/2006 | Kiesewetter et al. | |
| 7,311,216 B2 * | 12/2007 | Donnelly | B29C 67/0044 |
| | | | 220/1.5 |
| 7,462,311 B2 | 12/2008 | Kralik et al. | |
| 7,524,389 B2 | 4/2009 | Elbs et al. | |
| 7,798,565 B2 | 9/2010 | Johl et al. | |
| 7,942,475 B2 | 5/2011 | Murray | |
| 8,511,742 B2 | 8/2013 | Legler et al. | |
| 9,090,148 B2 | 7/2015 | Kiesewetter et al. | |
| 9,327,471 B2 | 5/2016 | Legler et al. | |
| 9,440,679 B2 | 9/2016 | Lee et al. | |
| 9,776,488 B2 * | 10/2017 | Bowles | B60J 7/11 |
| 10,400,448 B2 | 9/2019 | Gosling et al. | |
| 10,407,010 B2 * | 9/2019 | Tyan | B60R 19/34 |
| 10,429,006 B2 * | 10/2019 | Tyan | B32B 5/145 |
| 10,618,571 B2 * | 4/2020 | Whitesell, Jr. | B29C 70/10 |
| 10,913,233 B2 | 2/2021 | Dietz et al. | |
| 11,084,226 B2 * | 8/2021 | Poschner | B32B 37/146 |
| 11,685,135 B2 * | 6/2023 | Baumann | B32B 15/095 |
| | | | 428/116 |
| 11,898,399 B2 * | 2/2024 | Sing | B32B 15/10 |
| 2003/0218363 A1 | 11/2003 | Strohmavr et al. | |
| 2004/0104600 A1 | 6/2004 | Kiesewetter et al. | |
| 2005/0001347 A1 | 1/2005 | Kralik et al. | |
| 2005/0003208 A1 | 1/2005 | Graf et al. | |
| 2005/0029839 A1 | 2/2005 | Stemmer | |
| 2005/0242469 A1 | 11/2005 | Elbs et al. | |
| 2006/0108716 A1 * | 5/2006 | Strohmavr | B62D 29/04 |
| | | | 264/258 |
| 2008/0145608 A1 | 6/2008 | Bledsoe et al. | |
| 2009/0272436 A1 * | 11/2009 | Cheung | H01L 31/048 |
| | | | 257/E31.001 |
| 2010/0140984 A1 | 6/2010 | Murray | |
| 2011/0101731 A1 | 5/2011 | Legler et al. | |
| 2011/0226312 A1 | 9/2011 | Bohm et al. | |
| 2011/0262703 A1 | 10/2011 | Legler et al. | |
| 2011/0305869 A1 | 12/2011 | Pollak et al. | |
| 2012/0104799 A1 * | 5/2012 | Danielson | B62D 29/048 |
| | | | 296/193.06 |
| 2012/0231244 A1 | 9/2012 | Legler et al. | |
| 2012/0308768 A1 | 12/2012 | Mishra et al. | |
| 2013/0243998 A1 | 9/2013 | Preuss et al. | |
| 2013/0280473 A1 | 10/2013 | Preisler et al. | |
| 2013/0341971 A1 * | 12/2013 | Masini | B29C 70/86 |
| | | | 296/210 |
| 2014/0145470 A1 | 5/2014 | Preisler | |
| 2014/0159418 A1 | 6/2014 | Kiesewetter et al. | |
| 2015/0050485 A1 | 2/2015 | Wagner et al. | |
| 2016/0263976 A1 | 9/2016 | Bowles | |
| 2017/0157883 A1 * | 6/2017 | Sing | B32B 5/18 |
| 2017/0240217 A1 * | 8/2017 | Storz | B62D 21/02 |
| 2017/0297510 A1 * | 10/2017 | Lee | B62D 25/06 |
| 2017/0334168 A1 * | 11/2017 | Dry | B32B 15/04 |
| 2018/0036993 A1 | 2/2018 | Savonuzzi | |
| 2018/0050580 A1 | 2/2018 | Sviberg et al. | |
| 2018/0290418 A1 | 10/2018 | Nelson | |
| 2021/0362441 A1 * | 11/2021 | Noma | B32B 27/12 |
| 2022/0212449 A1 * | 7/2022 | Newcomb | B62D 29/043 |

FOREIGN PATENT DOCUMENTS

| | | | | |
|---|---|---|---|---|
| EP | 3613577 A1 | 2/2020 | | |
| EP | 3609670 B1 * | 8/2023 | | B29C 45/14336 |
| GB | 2531942 A | 5/2016 | | |
| JP | H10123009 A * | 5/2003 | | |
| WO | 2010093328 A1 | 8/2010 | | |

* cited by examiner

MULTI-DIMENSIONAL LOAD STRUCTURE

CROSS-REFERENCE TO RELATED APPLICATIONS

This application is a continuation-in-part of U.S. patent application Ser. No. 17/173,054, filed on Feb. 10, 2021, which issued as U.S. Pat. No. 11,535,306 on Dec. 27, 2022, and which is a continuation of and claims priority to U.S. patent application Ser. No. 16/110,409, filed on Aug. 23, 2018, which issued at U.S. Pat. No. 10,926,809 on Feb. 23, 2021, both of which are hereby incorporated by reference in its entirety.

FIELD OF TECHNOLOGY

The present disclosure pertains to a multi-dimensional load structure that may be employed, for example, but not limited to, in a vehicle where a load is applied, such as a floor panel, roof panel, hood, deck lid, side wall, structural member, and the like, and a method of manufacturing thereof.

BACKGROUND

Load structures, i.e., structures configured to withstand loads, are employed in all different kinds of applications, including, but not limited to, in vehicles as floor panels, roof panels, and the like. These load structures are often made of a paper honeycomb and are typically formed as thin panels that have sections in which the contour and/or thicknesses vary. One method of forming the load structures is using corrugated wave board blocks that are shaped prior to processing. Another method of forming a load structure involves pre-molding the geometric shapes or features that add thickness, and then adding them to the main panel when it is formed. However, load structures formed from these methods may have unpredictable weak areas, which may affect the ability of the load structure to withstand loads in its normal application and use.

Accordingly, there exists a need for an improved multi-dimensional load structure and method of manufacturing thereof to increase efficiency and minimize costs of manufacturing.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

An exemplary multi-dimensional load structure may include a base panel having a tiered structure with an upper layer, a lower layer, and at least one interior layer therebetween. The load structure may also have a glass layer applied to at least surfaces of each of the upper layer, the lower layer, and the at least one interior layer not in contact with an adjacent layer. The load structure may further have a coating applied to the exterior of the glass layer. The at least one interior layer may be configured to withstand a greater compressive force than the upper layer and the lower layer and/or the upper layer and the lower layer may be lighter than the at least one interior layer. The load structure may be used in vehicle, aerospace, ship, cargo, building, furniture, and other applications in which a structure is required to handle a load.

An exemplary method for manufacturing a multi-dimensional load structure may include first assembling a lower layer, at least one interior layer, and an upper layer to form a tiered structure. The method may then include forming the tiered structure into a panel, and then applying a glass layer to surfaces of each of the upper layer, the lower layer, and the at least one interior layer not in contact with an adjacent layer. The method may then include applying a coating to the glass layer, and finally, trimming the panel into a final shape of the multi-dimensional load structure.

Figure 1A:
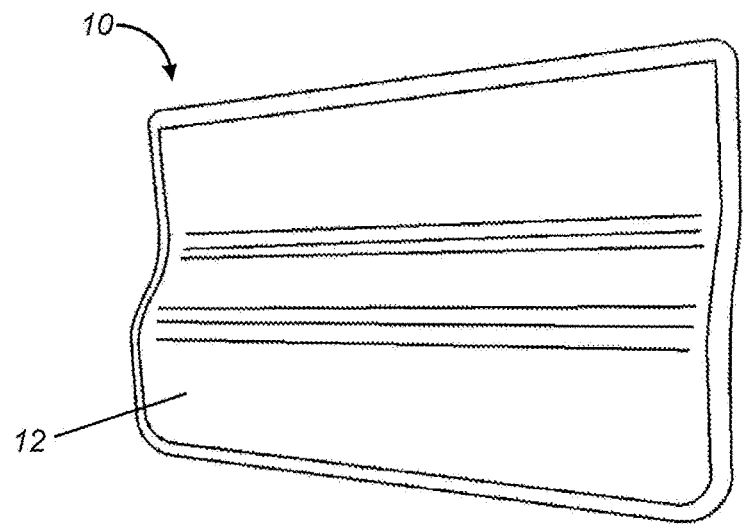
FIGS. 1A and 1B are perspective views illustrating an "A" side and "B" side of a multi-dimensional load structure according to one exemplary approach.
Figure 1B:
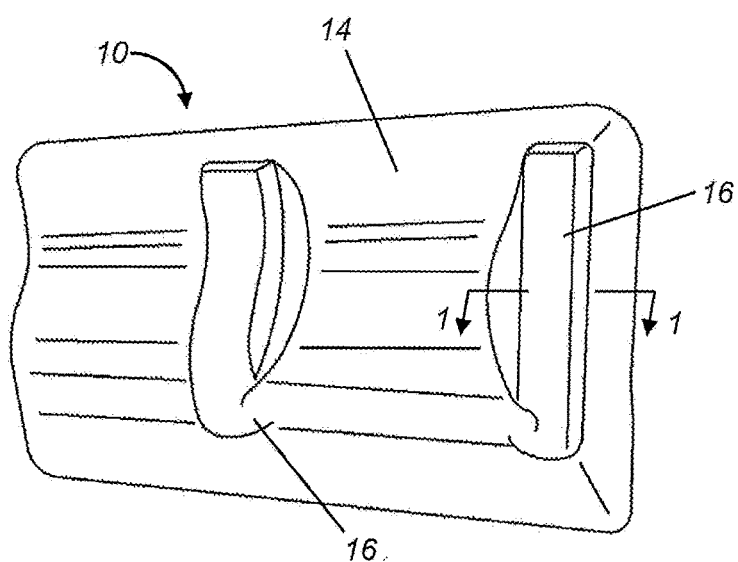
Figure 1C:
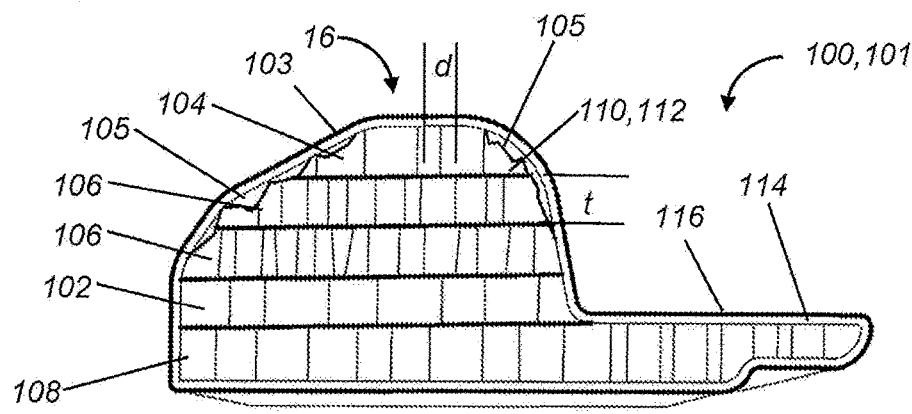
FIG. 1C is a partial, cross-sectional view, taken from line 1-1 of FIG. 1B, of the multi-dimensional load structure of FIGS. 1A and 1B.

Referring now to the figures, FIGS. 1A through 1C illustrate a multi-dimensional load structure 10 according to one exemplary approach. As can be seen in the figures, the load structure 10 may have varying contours and thicknesses. The sections 16 of the load structure 10 having increased thicknesses may be on a "B" side 14 of the load structure 10, as illustrated in FIG. 1B, which generally may not be visible or as readily visible, though it should be appreciated that such sections 16 may also be on an "A" side 12 of the load structure 10.

To achieve a structure with different thicknesses and/or having a curved profile 103, the load structure 10 may include a panel 100 having a tiered structure 101 in the areas of increased thickness and curved profile 103, as illustrated in FIG. 1C. The tiered structure 101 generally may have a lower layer 102, one or more interior layers 106, and an upper layer 104 stacked collectively on a base layer 108. Along the curved profile 103, the panel 100 may have deformed or crushed areas 105, where one or more of the layers 102, 104, or 106 may be deformed or crushed from its original structure during forming of the panel, as described in more detail hereinafter. While FIG. 1C illustrates two interior layers 106, it should be appreciated that there may be any number of interior layers 106, including just one. The load structure 10 also may have different numbers of interior layers 106 at different locations of the load structure 10 to form the desired shape and/or thickness. The layers 102, 104, 106, and 108 may or may not have the same thickness (t) as one or more of the other layers. Similar to the number of layers, the thicknesses of the layers may also be dependent upon the desired shape of the panel 100. For example, where the curved profile 103 has less of a slope, the thickness of the layers may be greater, and the quantity of layers may be less than areas where there is more of a slope. This may result in a smaller deformed or crushed area 105. The layers 102, 104, and 106 generally may be constructed such that the compressive force required to deform the interior layers 106 may be greater than that required to deform the lower and upper layers 102 and 104. Further, the lower and upper layers 102 and 104 may be lighter than the interior layers 106, which may help to ensure the center of the load structure, in particular, the interior layers 106, maintain structural integrity. Thus, the load structure 10 contemplates layers of varying sizes, shapes, and thicknesses.

The base layer 108 may have a layer of glass to stabilize the material of the layers at expansion during the forming process, which is described in more detail hereinafter, and to provide the fiber necessary for the composite which will form the skin of the "A side" 12 of the load structure 10. The base layer 108 generally may be large enough to accommodate handling through the forming process. The glass material may be oriented, woven, braided, random or any combination thereof, which may create the characteristics that the load structure 10 may require.

The layers 102, 104, 106, and 108 may be constructed of a material including paper, composite, thermoplastic, thermoset, or a combination thereof, and generally may have material properties required to form the panel 100. As merely one exemplary approach, one or more of the layers 102, 104, 106, and 108 may have at least one of a base weight ranging from 65 g/m2 to 212 g/m2, a density ranging from about 0.46 g/cm3 to 0.67 g/cm3, a Taber bending stiffness md (machine direction) ranging from about 1.66 gmf-cm to 61.03 gmf-cm, and a Taber bending stiffness rd (roll direction) ranging from about 0.73 gmf-cm to 23.6 gmf-cm. Each layer 102, 104, 106, and 108 may further have a honeycomb structure. The interior layers 106 generally may have a smaller cell construction than that of the lower and upper layers 102 and 104. As merely one example, the interior layers 106 may have a cell diameter (d) of 6 mm whereas the lower and upper layers 102 and 104 may have a cell diameter of 10 mm. The smaller cell construction of the interior layers 106 may allow for the greater compressive force required to deform the interior layers 106, as described above. The base layer 108 generally may be in contact with a forming tool along its entire surface. As such, the base layer 108 may be constructed with a 10 mm cell diameter honeycomb in one example.

The load structure 10 may also include paper layers 110 between each layer of the tiered structure 101. The paper generally may have a construction that may ensure that the compressive forces needed to form the panel are transferred through to the panel 100 from the forming tool, as described in more detail hereinafter, and force distortion of the paper to the outside of the panel 100. For example, the paper may be 4-40 lbs/ft$^2$, and may be, but is not limited to, kraft paper. The layers 102, 104, and 106 may be bonded together by an adhesive 112. The adhesive 112 may be water based or solvent based, and generally may be compatible with urethane, e.g., does not inhibit bonding of polyurethane to the paper, the inhibiting of bonding for which may result in fogging, odor, flammability, and the like.

The load structure 10 may also include a glass layer 114 around the panel 100. The glass may have a construction that is random, oriented, braided, woven, or any combination thereof. The load structure 10 may further have a coating 116 applied on and encapsulating the glass layer 114. The coating may be, but is not limited to, polyurethane, which may be rigid, and may be a foam, for example, 0.20 g/cc to 0.35 g/cc, or non-foaming. The amount of the coating 116 may be such that the weight is substantially equal to the weight of the glass layer 114 or as necessary to encapsulate deformed honeycomb structure.

Figure 2:
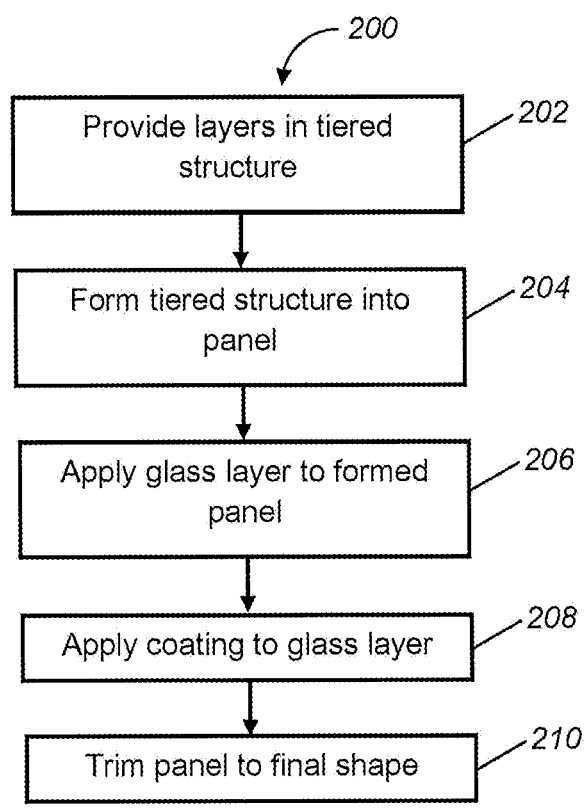
FIG. 2 is a schematic flow diagram of an exemplary method for manufacturing a multi-dimensional load structure.
Figure 3:
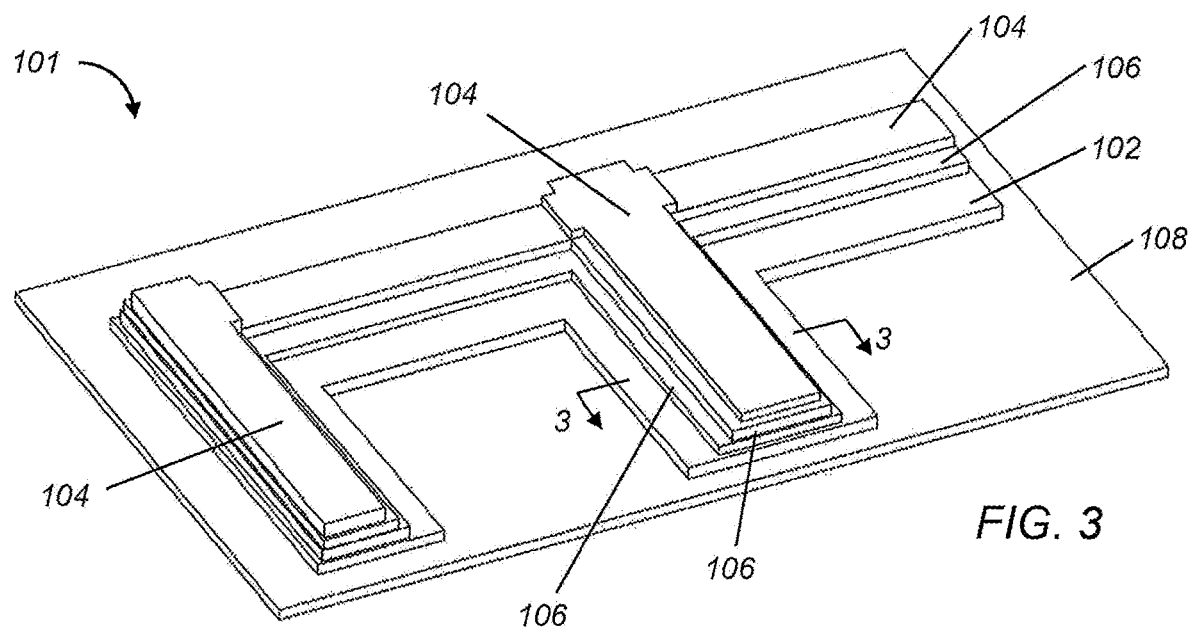
FIG. 3 is a schematic perspective view of a tiered structure of layers used to form the multi-dimensional load structure of FIGS. 1A and 1B.
Figure 5:
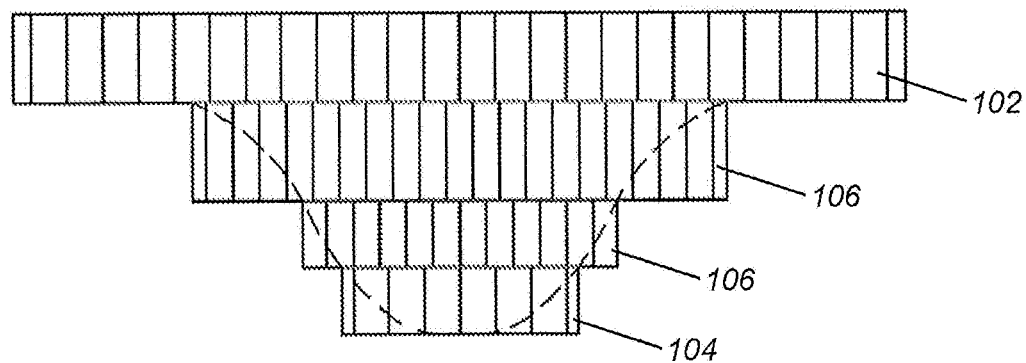
FIGS. 5-7 are schematic, partial cross-sectional views, taken from line 3-3 of FIG. 3, of the tiered structure of FIG. 3 through different steps of a forming process.

Referring now to FIG. 2, an exemplary method 200 for manufacturing a multi-dimensional load structure is illustrated. While method 200 is described hereinafter with respect to load structure 10, it should be appreciated that method 200 may be used to form any variations or embodiments of a load structure to which the steps are applicable. Method 200 generally may begin at step 202 in which the different layers, including, but not limited to, the lower layer 102, interior layers 106, and upper layers 104, may be assembled, for example, stacked, into a tiered structure 110 on a base 108 with a stepped configuration, as illustrated in FIGS. 3 and 5. It should be appreciated that the number of lower layers, upper layers, and interior layers may be the same or may be different, as illustrated, depending upon the final shape and profile of the load structure. As explained above, the layers 102, 104, and 106 may be a paper honeycomb structure, where the interior layers 106 generally have a smaller cell construction than that of the lower and upper layers 102 and 104 such that the compressive force required to deform the interior layers 106 may be greater than that required to deform the lower and upper layers 102 and 104.

Each layer may also have a paper layer 110 attached to one or more surfaces of the respective layer such that there may be a paper layer between each layer when assembled in the tiered structure 101. The paper layer 110 may be sized and located, i.e. to cover the respective surface to which the paper is attached, to be substantially equal to the area of contact between adjacent layers, where exposed surfaces of the layers do not have the paper layer. The layers with the paper layer 110 may be bonded to one another via an adhesive, which may be compatible with urethane, and may be water based or solvent based.

Figure 4:
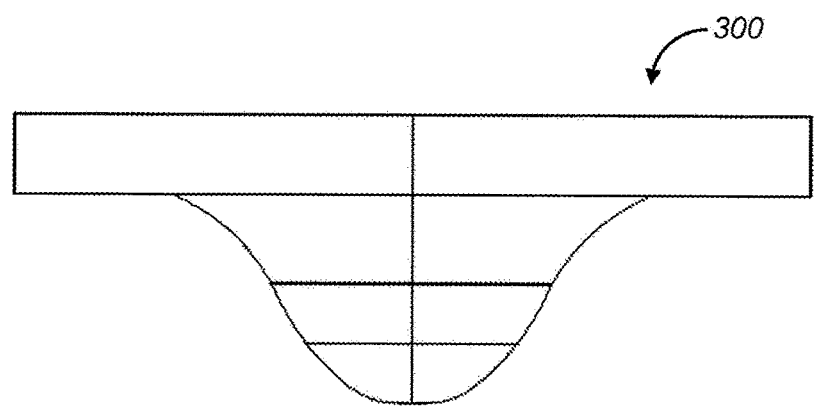
FIG. 4 is a schematic cross-sectional view of a preform mold used to shape the tiered structure of FIG. 3 into a panel.
Figure 6:
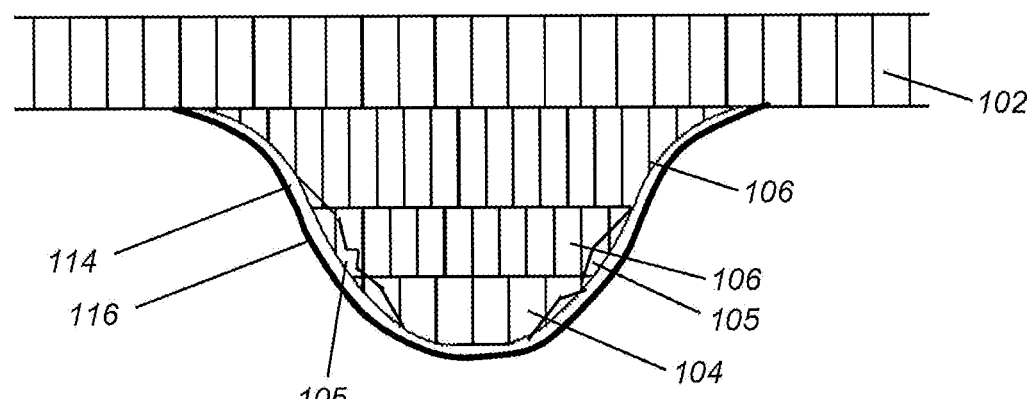
Figure 7:
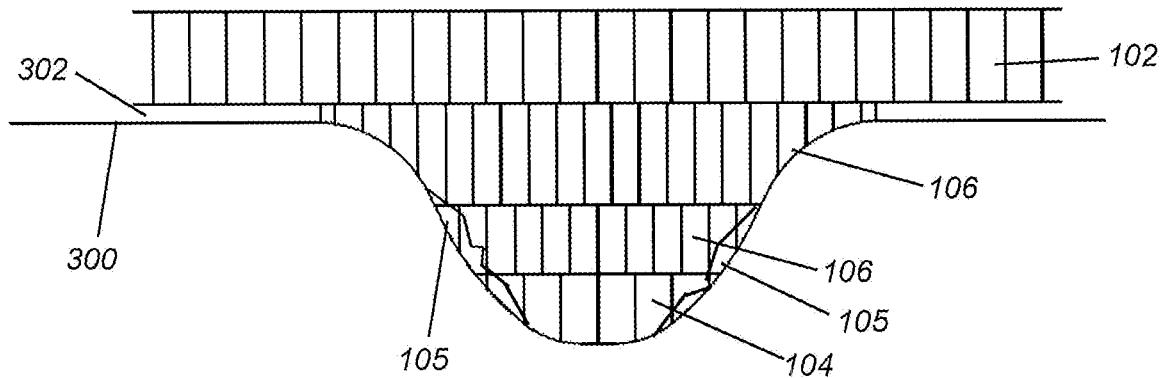

After step 202, method 200 may proceed to step 204 in which the tiered structure 101 may be formed into a panel 100, as seen in FIGS. 5 and 6. This may be done by preforming via a preform mold that defines the desired contour, i.e., has substantially the same shape as the final load structure. During such forming, one or more of the layers 102, 104, and 106 may be crushed, forming deformed or crushed areas 105, such that the tiered structure 101 may have the curved profile 103. A lower tool 300 according to one exemplary approach is illustrated in FIG. 4. When the preform mold is in an open position, the lower tool 300 may have a clearance 302 from a surface of one of the layers, as seen in FIG. 7. As merely one example, the clearance may be between 2 and 3 mm.

After step 204, method 200 may proceed to step 206 in which a glass layer 114 may be applied to the panel 100.

Step 206 may include placing the glass material on the inside of the lower tool 300. The amount of glass material may be sized so as to cover the entire surface of the panel 100. As explained above, the glass material may be random, oriented, braided, woven, or any combination thereof. Any reinforcements and/or inserts needed may also be placed in the inside of the lower tool 300 at this time. Then, an adhesive may be applied, for example, by spraying, on the glass material in the lower tool 300 and/or on the panel. The adhesive generally may be urethane compatible. The preform mold may then be closed to allow the adhesive to cure.

After step 206, method 200 may proceed to step 208 in which a coating 116 may be applied to the glass layer 114. Additional material may also be added at this time to fill the geometry, where needed. As explained above, the coating 116 may be, but is not limited to polyurethane, which may be rigid and foaming or non-foaming, and the amount of coating may be such that the coating encapsulates the glass layer and has a weight that is substantially equal to the weight of the glass layer. To apply the coating 116, the panel 100 may be removed from the preform mold and placed on a load table designed to hold the panel 100 in a positive repetition. The panel 100 may then be picked off of a load station, which may be done via an end-of-arm-tool, which in turn may be attached to a robot that may transfer the panel 100 to a spray booth where the coating material, e.g., polyurethane, may be applied via spraying. The spraying may be accomplished using a fix mounted spray head or a moving spray head. The end-of-arm-tool may then transport the panel with the coating applied thereto, and transfer it back to a heated mold, which is closed and pressed until the coating has cross-linked. After the coating 116 has cured, the panel 100 may be removed from the press.

Method 200 may end at step 210 where the panel 100 may be trimmed. This may be performed via a matched steel tool, a rule die, in mold pinch, in mold by-pass, a waterjet cutting system, or the like.

The resulting panel 100 may result in a load structure 10 having varying compression, load, and performance characteristics based on a desired engineering performance behavior. Collectively, the layers 102, 104 and 106 may provide and be formed in to first, second, and/or third layers of a 3-D load structure 10 to create a composite sandwich that can have varying thicknesses, shapes, and/or densities, that may be tailored to unique product applications so as to provide enhanced performance characteristics. It will be appreciated that the number of layers can be 1–n. It will be further appreciated that the number of compound shapes can be 1–n, as is shown in exemplary FIG. 1B where at least two compound shapes are illustrated.

In general, the tiered structure of the panel is advantageous in that deformation of the layers, e.g., of the paper material of the honeycomb structure, during forming of the panel may occur on an outer periphery of the formed (molded) panel. The coating (polyurethane) may then encapsulate the deformed paper (in addition to the glass layer). This reduces the impact of the deformed paper on the structure of the final load structure, e.g., unpredictable weak areas.

Figure 8:
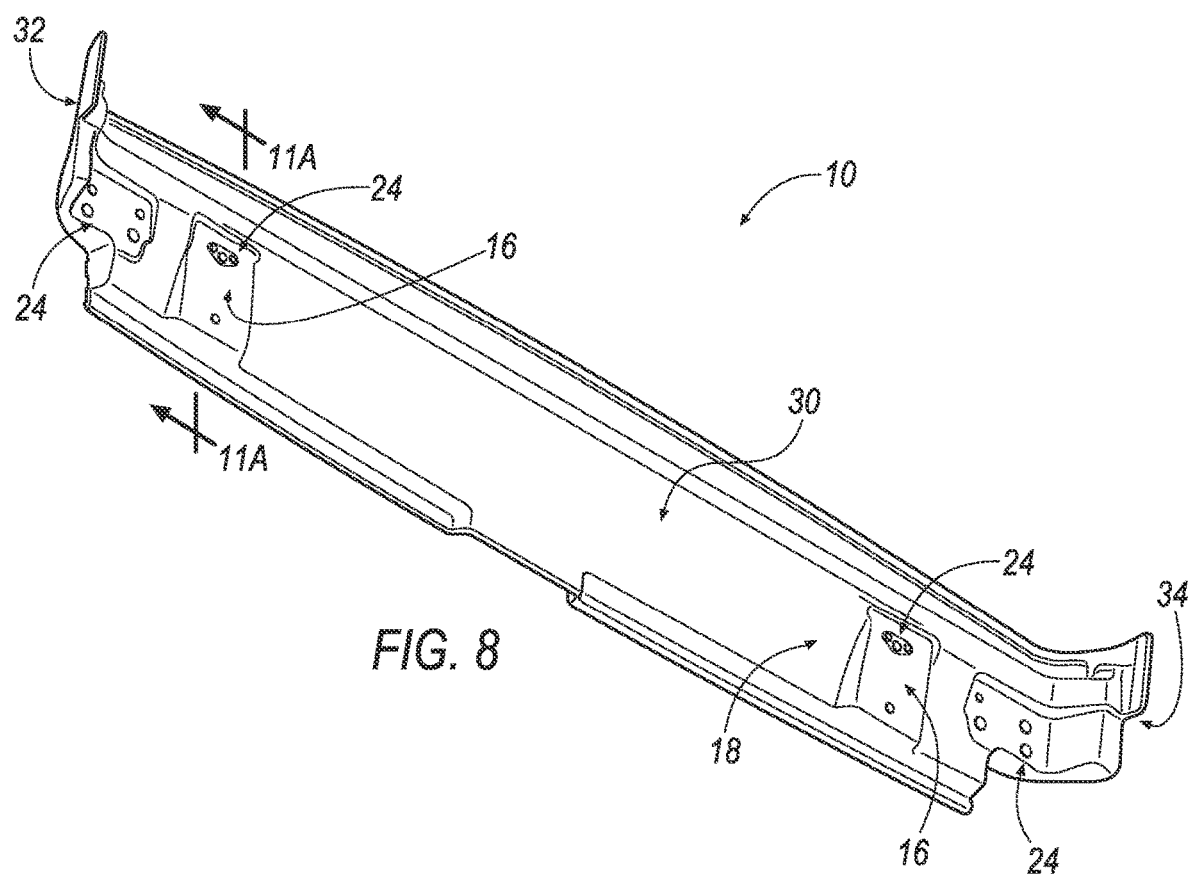
FIG. 8 is a perspective view of an additional multi-dimensional load structure.
Figure 9:
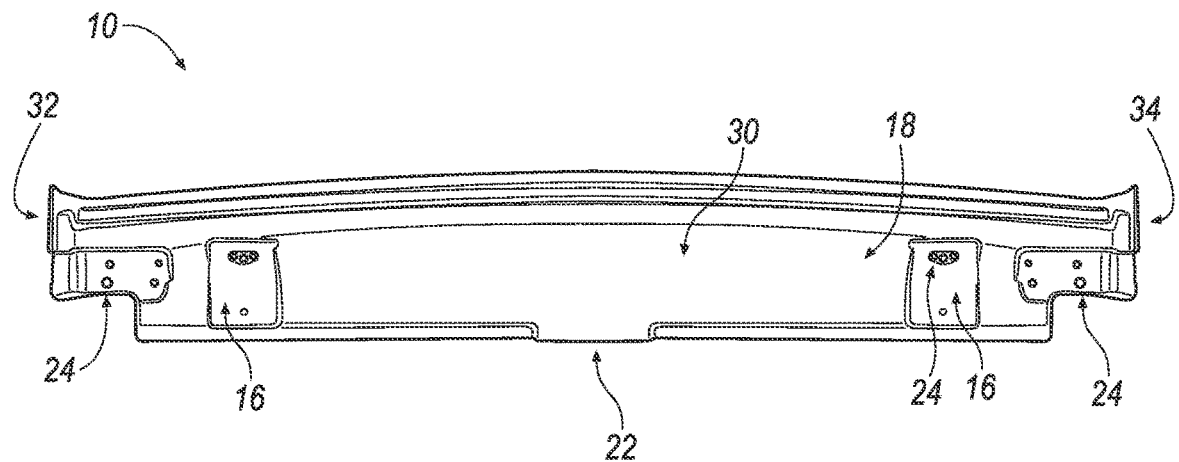
FIG. 9 is a bottom view of the load structure of FIG. 8.
Figure 10:
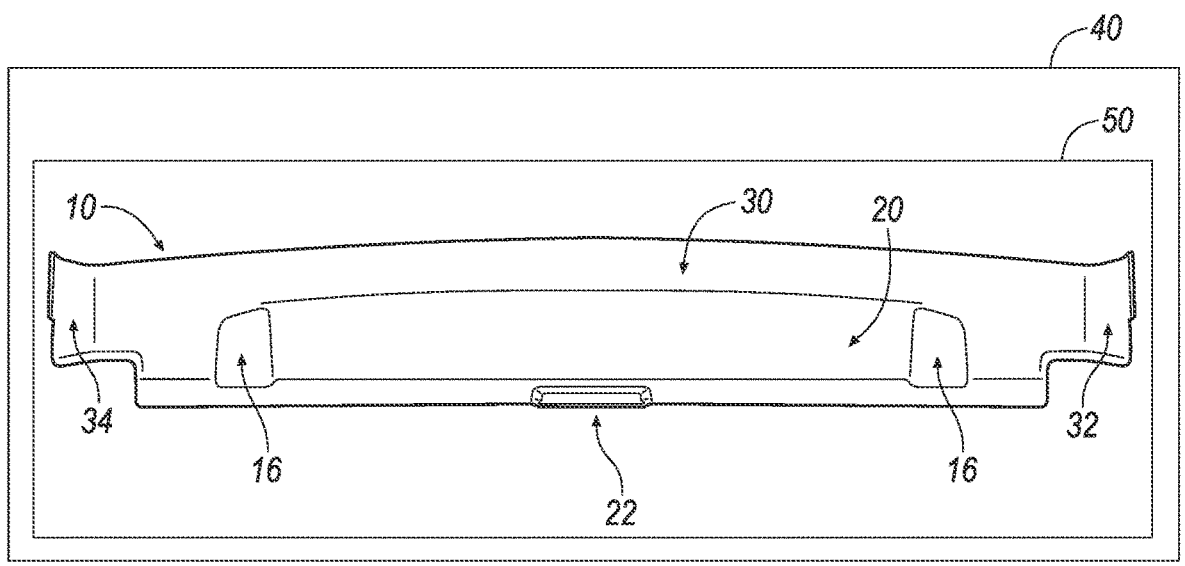
FIG. 10 is a top view of the load structure of FIG. 8.

Referring now to FIGS. 8-10, an additional multi-dimensional load structure 10 is shown. The load structure 10 may be a header bow for a vehicle 40 with a removable roof 50 (e.g., a convertible, a truck, or a SUV, among others). In some example configurations, the load structure 10 may be disposed within and/or may be connected to the removable roof 50 of the vehicle 40 (see, e.g., FIG. 10, top view). The load structure 10 may include various shapes, sizes, and/or configurations.

The load structure 10 includes a first side 18 (e.g., a lower side) and a second side 20 (e.g., a top side) spaced apart from the first side 18. In some configurations, when the load structure is installed onto, or in connection with, the vehicle 40, the first side 18 may face an interior of the vehicle 40. In some examples, the load structure 10 includes a base portion 30 and a first curved end portion 32 and a second curved end portion 34. The first and second end portions 32, 34 may be disposed at terminal ends of the base portion 30. The first and second end portions 32, 34 may be arranged to at least partially wrap around and/or engage portions of a frame of the vehicle 40. It will be appreciated that while the load structure 10 is shown being used with the vehicle 40, that components other than a header bow are contemplated as this disclosure contemplates the load structure 10 being used with other components of a vehicle or other system. Further, the load structure 10 may be an automotive, heavy duty equipment, or other device, which can be permanently part of, affixed to, or removable from a vehicle, or the like.

In some example configurations, the load structure 10 may include a handle 22 and one or more fasteners 24. In some instances, the handle 22 may be arranged to face a rear end of the vehicle 40. The handle 22 may be configured such that an operator (e.g., a driver, a passenger, a mechanic, etc.) of the vehicle 40 may manipulate the handle 22 to help facilitate the removal of the roof 50 of the vehicle 40.

A fastener 24 may be configured to attach to external components (such as a feature on a vehicle) and may include one among an insert, a treaded insert, a nut, a support, a bolt, a rod, a pin, or a screw, among others. The external components may include additional components and/or portions of the removable roof 50 and/or the vehicle 40, among other things. In some instances, the load structure 10 may include a plurality of fasteners 24.

In some configurations, one or more fasteners 24 may be configured to help, at least in part, secure the load structure 10 to the removable roof 50. In some examples, one or more latches (not depicted) may be coupled to the load structure 10 via some of the fasteners 24. The latches may be configured to selectively lock the removable roof 50 to the vehicle 40.

As can be seen in the figures, the load structure 10 may have varying contours and thicknesses. For instance, the load structure 10 may include one or more sections 16 that have increased thicknesses, a mounting pad, a boss, etc. To achieve a structure with different thicknesses and/or having a curved profile 103, the load structure 10 may include a panel 100 having a tiered structure 101 in the areas of increased thickness and/or curved profile 103, as illustrated in FIG. 11A.

Figure 11A:
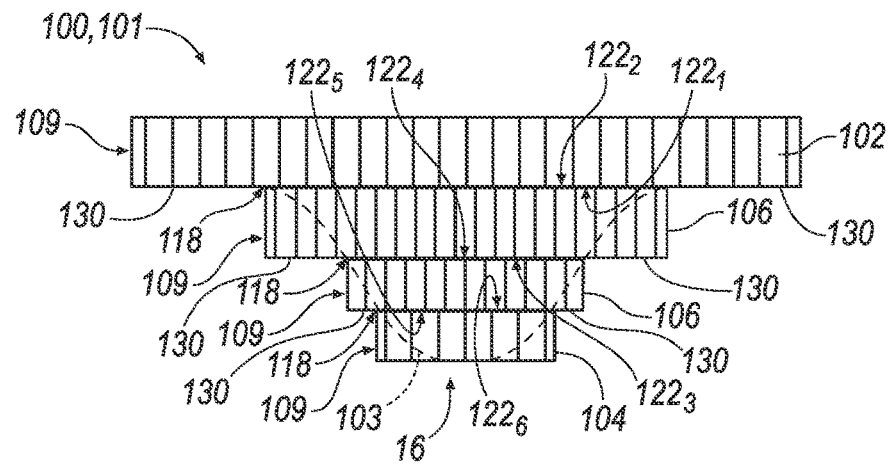
FIG. 11A is a partial, cross-sectional view, taken from line 11A-11A of FIG. 8.
Figure 11B:
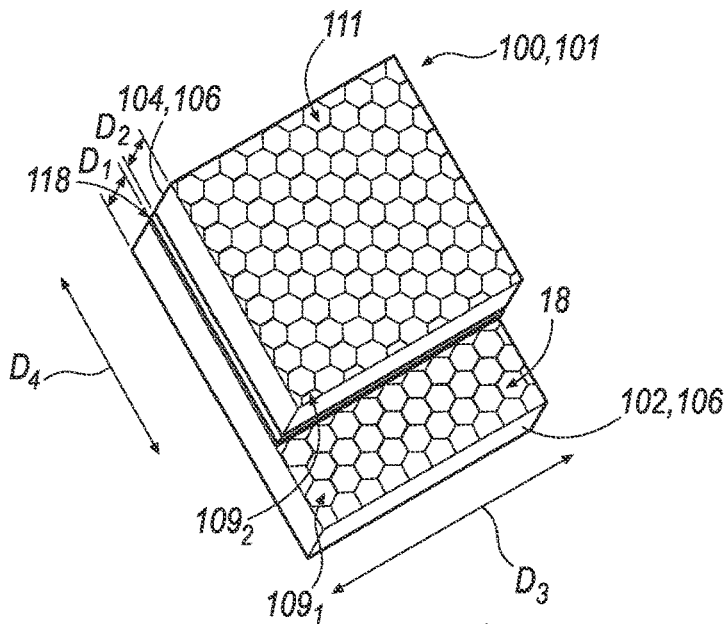
FIG. 11B is a partial schematic perspective view of the load structure of FIG. 8.

Referring now to FIG. 11A, the tiered structure 101 generally may have a lower honeycomb layer 102, one or more interior honeycomb layers 106, and an upper honeycomb layer 104 stacked collectively on a base honeycomb layer 108. In some example configurations, the tiered structure 101 includes a plurality of intermediate layers 118 disposed between one or more pairs of adjacent honeycomb layers.

For example, and without limitation, the intermediate layers 118 may be disposed between the base honeycomb layer 108 and the lower honeycomb layer 102, the lower honeycomb layer 102 and an interior honeycomb layer 106, adjacent interior honeycomb layers 106, and/or an interior honeycomb layer 106 and an upper honeycomb layer 104. In some instances, the intermediate layers 118 may be disposed between each of the honeycomb layers 102, 104, 106, 108 of the tiered structure 101. The load structure 10 is generally shown having four honeycomb layers. The load structure 10 may include more or less than four honeycomb layers within the scope of the present disclosure.

Referring now to 11B, in some example configurations, each honeycomb layer 102, 104, 106, 108 of the tiered structure 101 comprises a plurality of ribbons 109. The ribbons 109 may include a plurality of cells 111 that form a honeycomb structure. The cells 111 may include shapes that are substantially polygonal (e.g., rectangular, hexagonal, etc.) or circular. The layers 102, 104, 106, 108 may be arranged such that the ribbons 109 of each respective layer are vertically aligned. For instance, first ribbons $109_1$ of a first honeycomb layer (e.g., 102, 106) may extend in a first vertical direction $D_1$ and second ribbons $109_2$ of a second honeycomb layer (e.g., 104, 106) may extend in a second vertical direction $D_2$. The first and second ribbons $109_1$, $109_2$ may be vertically aligned such that the first vertical direction $D_1$ is parallel to and/or the same as the second vertical direction $D_2$.

In some examples, the ribbons 109 of each respective honeycomb layer may be arranged in different horizontal orientations relative to one another, while still being vertically aligned. For example, first ribbons $109_1$ of a first honey layer (e.g., 102, 106) may be aligned in a first horizontal direction (e.g., $D_3$), and second ribbons $109_2$ of a second layer (e.g., 104, 106) may be aligned in a second horizontal direction (e.g., $D_4$). The first horizontal direction may be orthogonal to the second horizontal direction. In some examples, the ribbons 109 of each respective layer may be arranged in similar and/or the same horizontal orientations. For instance, the first horizontal direction may be parallel to and/or the same as the second horizontal direction.

Figure 11C:
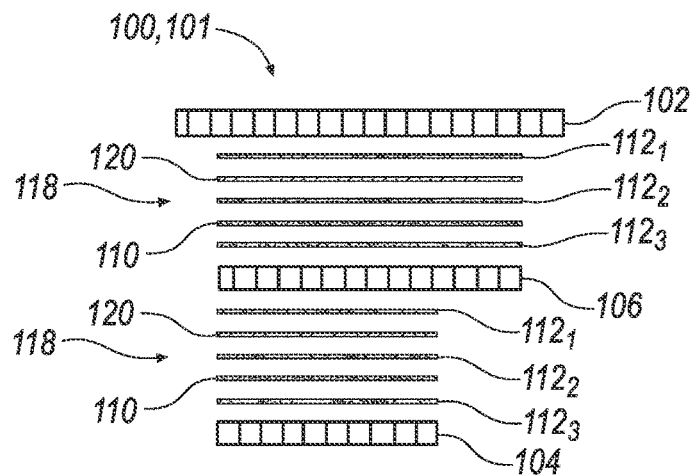
FIG. 11C is a partial schematic exploded view of the layers of the load structure of FIG. 8.

With reference to FIG. 11C, in some example configurations, the intermediate layers 118 may include a paper layer 110, one or more adhesive layers 112 (e.g., a first adhesive layer $112_1$, a second adhesive layer $112_2$, and a third adhesive layer $112_3$) and a fiberglass layer 120. Collectively this arrangement forms a layered sandwich construction, wherein moisture is kept from transferring through the layered construction.

For example, and without limitation, a paper layer 110 may comprise one of a paper, a paper board (e.g., cardboard), or a kraft paper, among others. An adhesive layer (e.g., $112_{1-3}$) may comprise an adhesive material that may be water based or solvent based, and generally may be compatible with urethane, e.g., does not inhibit bonding of polyurethane to the paper, the inhibiting of bonding for which may result in fogging, odor, flammability, and the like. A fiber glass layer 120 may comprise a fiber-reinforced plastic including glass fiber, among others.

In some example configurations, a first adhesive layer $112_1$ may be disposed between a first honeycomb layer (e.g., 102) and a fiberglass layer 120. The fiberglass layer 120 may be disposed between the first adhesive layer $112_1$ and a second adhesive layer $112_2$. The second adhesive layer $112_2$ may be disposed between a paper layer 110 and a third adhesive layer $112_3$. The third adhesive layer $112_3$ may be disposed between the paper layer 110 and a second honeycomb (e.g., 106).

In some configurations, a first adhesive layer $112_1$ may be disposed between the second honeycomb layer (e.g., 106) and a fiberglass layer 120. The fiberglass layer 120 may be disposed between the first adhesive layer $112_1$ and a second adhesive layer $112_2$. The second adhesive layer $112_2$ may be disposed between a paper layer 110 and a third adhesive layer $112_3$. The third adhesive layer $112_3$ may be disposed between the paper layer 110 and a third honeycomb layer (e.g., 104). The purpose of the paper layer 110 is to stabilize one or more of the honeycomb layers, for example, during expansion and subsequent processes, provide a uniform bonding surface for an additional layer of honeycomb, and to distribute the compression load at forming to insure the deformation of the exterior honeycomb.

Referring now to FIG. 11A, in some implementations, the intermediate layers 118 may be sized and located to cover, at least partially, one or more surfaces $122_{1-6}$ of the respective honeycomb layers. For example, and without limitation, a first honeycomb layer (e.g., 102) may include a first surface (e.g., $122_1$) that faces a second honeycomb layer (e.g., 106), and the second honeycomb layer may include a second surface (e.g., $122_2$) that faces the first honeycomb layer. The first surface may be larger than the second surface (e.g., include a larger surface area). A plurality of intermediate layers 118 may be arranged and sized such as to cover an area of contact between the first and second honeycomb layers. The area of contact may include a size that is substantially equal to the size of the second surface. In some instances, exposed portions 130 of the first surface of the first honeycomb layer may not include the intermediate layers 118.

The second honeycomb layer (e.g., 106) may include a third surface (e.g., $122_3$) that faces a third honeycomb layer (e.g., 106), and the third honeycomb layer may include a fourth surface (e.g., $122_4$) that faces the second honeycomb layer. The third surface may be larger than the fourth surface (e.g., include a larger surface area). A plurality of intermediate layers 118 may be arranged and sized such as to cover an area of contact between the second and third honeycomb layers. The area of contact may include a size that is substantially equal to the size of the fourth surface. In some instances, exposed portions 130 of the third surface of the second honeycomb layer may not include the intermediate layers 118.

The third honeycomb layer (e.g., 106) may include a fifth surface (e.g., $122_5$) that faces a fourth honeycomb layer (e.g., 104), and the fourth honeycomb layer may include a sixth surface (e.g., $122_6$) that faces the third honeycomb layer. The fifth surface may be larger than the sixth surface (e.g., include a larger surface area). A plurality of intermediate layers 118 may be arranged and sized such as to cover an area of contact between the third and fourth honeycomb layers. The area of contact may include a size that is substantially equal to the size of the sixth surface. In some instances, exposed portions 130 of the fifth surface of the third honeycomb layer may not include the intermediate layers 118.

In some example configurations, the intermediate layers 118 are arranged between adjacent honeycomb layers such as to restrict and/or prevent air flow between the adjacent honeycomb layers. For example, the intermediate layers 118 may be arranged between adjacent honeycomb layers such that the adjacent honeycomb layers are non-permeable and/or are not in fluid communication with one another. In some examples, the intermediate layers 118 are configured to aid in the bonding between the adjacent honeycomb layers. The intermediate layers 118 may add strength and/or rigidity to the tiered structure 101 such as to prevent undesirable crushing (e.g., deformation) of certain honeycomb layers 102, 104, 106, 108.

Figure 12:
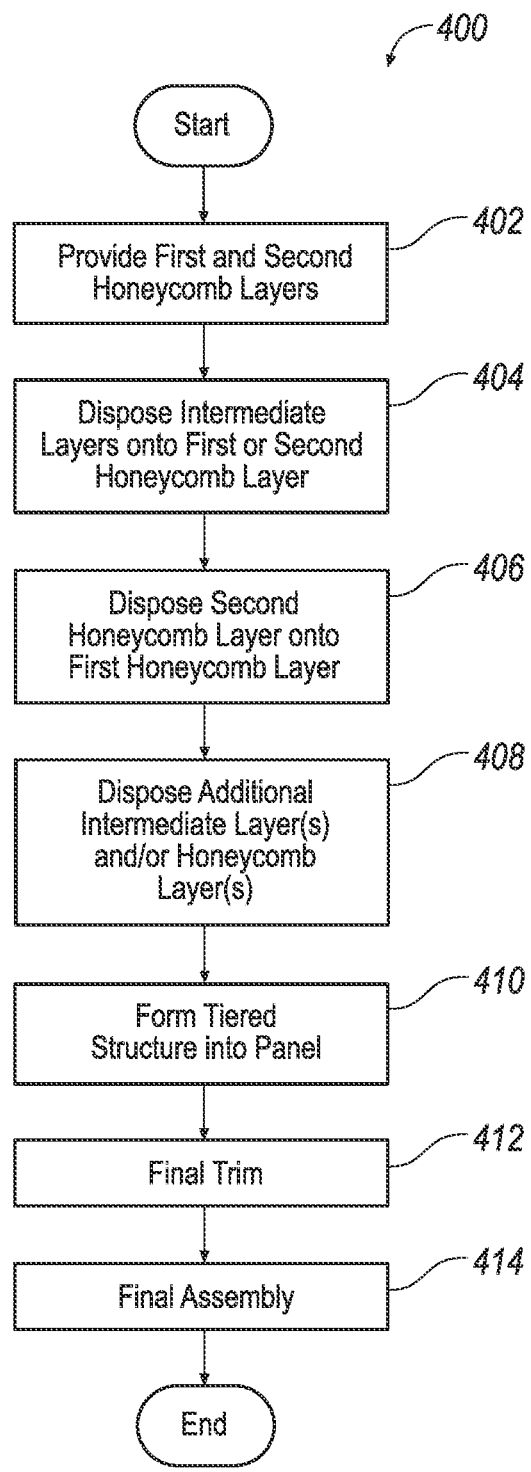
FIG. 12 is a schematic flow diagram of a method for manufacturing the load structure of FIG. 8.

Referring now to FIG. 12, an additional exemplary method 400 for manufacturing a multi-dimensional load structure (e.g., a load structure 10 as depicted in FIGS. 8-10) is illustrated. The method 400 may include steps that are substantially similar to the steps of method 200. The method 400 may include, but is not limited to, forming a tiered structure including providing a first honeycomb layer and a second honeycomb 402, disposing a plurality of intermediate layers onto the first honeycomb layer or the second honeycomb layer 404, disposing a second honeycomb layer onto the first honeycomb layer 406, providing additional intermediate layers and/or honeycomb layers 408, forming the tiered structure into a panel 410, conducting a final trim process 412 to remove excess material, and providing a final assembly 414 such as adding hardware, etc. It will be appreciated that other steps may be deployed.

Method 400 may begin at step 402 in which a first honeycomb layer (e.g., 102) and a second honeycomb layer (e.g., 106) is provided. Step 402 generally may begin the process of forming a tiered structure 101 of the load structure 10. For instance, the tiered structure 101 may be formed in a similar manner as in step 202 of method 200, except for certain differences that are discussed below.

After step 402, the method 400 may proceed to step 404 in which a plurality of intermediate layers 118 are disposed onto the first honeycomb layer or the second honeycomb layer. In some instances, the intermediate layers 118 may be disposed onto the first honeycomb layer and, in other instances, the intermediate layers 118 may be disposed onto the second honeycomb layer prior to first and second honeycomb layers being joined.

The intermediate layers may include one or more adhesive layers $112_{1-3}$, a fiberglass layer 120, and a paper layer 110. For example, and without limitation, a first adhesive layer $112_1$ may be disposed (e.g., sprayed, rolled, injected, etc.) onto a surface (e.g., $122_1$) of the first honeycomb layer (e.g., 102) or a surface (e.g., $122_2$) of the second honeycomb layer (e.g., 106).

A fiberglass layer 120 may be disposed onto the first adhesive layer $112_1$. For example, the fiberglass layer 120 may be pulled from a roll of fiberglass and placed onto the first adhesive layer $112_1$ and/or the fiberglass layer 120 may be in the form of a sheet that is placed onto the first adhesive layer $112_1$, among others.

A second adhesive layer $112_2$ may be disposed onto the fiberglass layer 120. The second adhesive layer $112_2$ may be substantially similar to the first adhesive layer $112_1$. For instance, the second adhesive layer $112_2$ may comprise the same adhesive and/or may be applied in the same manner as an adhesive of the first adhesive layer $112_1$. In some examples, the second adhesive layer $112_2$ may include one or more different characteristic (e.g., thickness, material composition, size of surface area coverage, etc.) than the first adhesive layer $112_1$. Alternatively, the first adhesive layer $112_1$ may be applied to a first side of the fiberglass layer 120 and/or the second adhesive layer $112_2$ may be applied to second side of the fiberglass layer 120 prior to the fiberglass layer being disposed onto the first honeycomb layer or the second honeycomb layer.

A paper layer 110 may be disposed onto the second adhesive layer $112_2$ and a third adhesive layer $112_3$ may be disposed onto the paper layer 110. The third adhesive layer $112_3$ may be substantially similar to the first and second adhesive layers $112_{1-2}$. For instance, the third adhesive layer $112_3$ may comprise the same adhesive and/or may be applied in the same manner as adhesives of the first and second adhesive layers $112_{1-2}$. In some examples, the third adhesive layer $112_3$ may include one or more different characteristic (e.g., thickness, material composition, size of surface area coverage, etc.) than the adhesives of the first and second adhesive layers $112_{1-2}$.

Alternatively, the second adhesive layer $112_2$ may be applied to a first side of the paper layer 110 and the third adhesive layer $112_3$ may be applied to a second side of the paper layer 110 prior to the paper layer 110 being disposed onto the first honeycomb layer or the second honeycomb layer. In some examples, the paper layer 110, the fiberglass layer 120, and/or the adhesive layers $112_{1-3}$ may be joined together prior to being disposed onto the first honeycomb layer or the second honeycomb layer.

After step 404, the method 400 may proceed to step 406 in which the second honeycomb layer (e.g., 106) is disposed onto the first honeycomb layer (e.g., 102) such that the intermediate layers 118 are disposed between the first and second honeycomb layers. The second honeycomb layer may be disposed onto the first honeycomb layer such that the first and second honeycomb layers are vertically aligned. For instance, ribbons of the first honeycomb layer may be vertically aligned with ribbons of the second honeycomb layer.

After step 406, the method 400 may proceed to step 408 in which additional intermediate layers 118 and/or honeycomb layers (104, 106, etc.) may be disposed onto the second honeycomb layer. It should be appreciated that the number of honeycomb layers (e.g., lower honeycomb layers, upper honeycomb layers, and interior honeycomb layers) may be the same or may be different, as illustrated in the figures. For instance, the number of honeycomb layers depends upon the final desired shape and profile of the load structure 10.

In some examples, step 408 may include providing a third honeycomb layer (e.g., 104, 106). A plurality of intermediate layers 118 may be disposed onto the second honeycomb layer or the third honeycomb layer. The third honeycomb layer may subsequently be disposed onto the second honeycomb layer such that ribbons of the third honeycomb layer are vertically aligned with ribbons of the first and second honeycomb layers.

After step 408, the method 400 may proceed to step 410 in which the tiered structure 101 may be formed into a panel. Step 408 may be substantially similar to and/or conducted in a similar manner as step 204 of method 200. In some examples, a glass layer 114 may be applied to the panel 100. The glass layer 114 may be applied to the panel 100 in a similar manner as step 206 of method 200. In some instances, a coating 116 may be applied to the glass layer 114. The coating 116 may be applied to the glass layer 114 in a similar manner as step 208 of method 200.

After step 410, the method 200 may proceed to step 412 in which the panel 100 may undergo final trimming. The panel 100 may be placed in a trim tool, which may be designed to remove any excess material such that the panel 100 is trimmed to the final footprint of the load structure 10. Step 412 may be substantially similar to and/or conducted in a similar manned as step 210 of method 200.

After step 412, the method 400 may proceed to step 414, during which the panel 100 may undergo final assembly, for example, by attaching a handle (e.g., handle 22), hardware, or other external feature(s) (e.g., fasteners 24) to the panel 100. In some examples, the fasteners 24 may be added to the panel 100 prior to step 414. For instance, the fasteners 24 may be added to the panel 100 during the forming the tiered structure 101. In some instances, a portion of at least one of the fasteners may be disposed within and/or fixed to the panel.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A load structure, comprising:
   a first honeycomb layer;
   a second honeycomb layer;
   a plurality of intermediate layers disposed between the first and second honeycomb layers, the intermediate layers including one or more adhesive layers, a fiberglass layer, and a paper layer; and
   a third honeycomb layer,
   wherein the second honeycomb layer is disposed between the first honeycomb layer and the third honeycomb layer, and
   wherein:
   the first honeycomb layer includes a plurality of first ribbons that extend in a first vertical direction;
   the second honeycomb layer includes a plurality of second ribbons that extend in a second vertical direction;
   the third honeycomb layer includes a plurality of third ribbons that extend in a third vertical direction; and
   the first, second, and third ribbons are vertically aligned such that the first, second, and third vertical directions are similar.

2. The load structure of claim 1, wherein:
   the first honeycomb layer includes a plurality of first ribbons that extend in a first vertical direction;
   the second honeycomb layer includes a plurality of second ribbons that extend in a second vertical direction; and
   the first and second ribbons are vertically aligned such that the first vertical direction is parallel to the second vertical direction.

3. The load structure of claim 1, wherein:
   the first honeycomb layer includes a first surface facing the second honeycomb layer;
   the second honeycomb layer includes a second surface facing the first honeycomb layer; and
   the intermediate layers are arranged to cover at least portions of the first and second surfaces such that the first and second honeycomb layers are not in fluid communication.

4. The load structure of claim 1, wherein the one or more adhesive layers include a first adhesive layer, a second adhesive layer, and a third adhesive layer.

5. The load structure of claim 4, wherein:
   the first adhesive layer is disposed between the first honeycomb layer and the fiberglass layer;
   the second adhesive layer is disposed between the fiberglass layer and the paper layer; and
   the third adhesive layer is disposed between the paper layer and the second honeycomb layer.

6. The load structure of claim 1, including an additional plurality of intermediate layers disposed between the second and third honeycomb layers.

7. The load structure of claim 1, including one or more fasteners that are configured to attach to external components.

8. The load structure of claim 1, wherein the load structure is a header bow.

9. A vehicle, comprising:
   a removable roof; and
   a load structure according to claim 1;
   wherein the load structure is disposed within or connected to the removable roof.

10. A method of manufacturing a load structure, the method comprising:
    providing a first honeycomb layer and a second honeycomb layer;
    disposing a plurality of intermediate layers onto the first honeycomb layer or the second honeycomb layer;
    disposing the second honeycomb layer onto the first honeycomb layer;
    wherein the intermediate layers include one or more adhesive layers, a fiberglass layer, and a paper layer; and
    providing a third honeycomb layer,
    wherein providing the third honeycomb layer includes disposing an additional plurality of intermediate layers onto the second honeycomb layer or the third honeycomb layer; and
    disposing the third honeycomb layer onto the second honeycomb layer, and
    wherein:
    the first honeycomb layer includes a plurality of first ribbons that extend in a first vertical direction;
    the second honeycomb layer includes a plurality of second ribbons that extend in a second vertical direction; and
    the third honeycomb layer includes a plurality of third ribbons that extend in a third vertical direction.

11. The method of claim 10, wherein the first honeycomb layer includes a plurality of first ribbons that extend in a first vertical direction and the second honeycomb layer includes a plurality of second ribbons that extend in a second vertical direction; and
    the method further including vertically aligning the first and second ribbons such that the first vertical direction is parallel to the second vertical direction.

12. The method of claim 10, wherein disposing the plurality of intermediate layers to the first honeycomb layer or the second honeycomb layer includes covering an area disposed between the first and second honeycomb layers such that the first and second honeycomb layers are not in fluid communication.

13. The method of claim 10, wherein disposing the plurality of intermediate layers to the first honeycomb layer or the second honeycomb layer includes disposing a first adhesive layer, a second adhesive layer, and a third adhesive layer.

14. The method of claim 13, wherein disposing the plurality of intermediate layers to the first honeycomb layer or the second honeycomb layer includes:
   disposing the first adhesive layer onto a first surface of the first honeycomb layer or a second surface of second honeycomb layer;
   disposing the fiberglass layer onto the first adhesive layer;
   disposing the second adhesive layer onto the fiberglass layer;
   disposing the paper layer onto the second adhesive layer; and
   disposing the third adhesive layer onto the paper layer.

15. The method of claim 10, including vertically aligning the first, second, and third ribbons such that the first, second, and third vertical directions are parallel.

16. The method of claim 10, wherein the load structure is a header bow for a vehicle.

17. A load structure, comprising:
   a header bow, the header bow including:
   a first honeycomb layer including a first plurality of ribbons that extend in a first direction;
   a second honeycomb layer including a second plurality of ribbons that extend in a second direction;
   a third honeycomb layer including a third plurality of ribbons that extend in a third direction, where the second honeycomb layer is positioned between the first honeycomb layer and the third honeycomb layer; and
   a plurality of intermediate layers disposed between the first and second honeycomb layers, the intermediate layers including one or more adhesive layers, a fiberglass layer, and a paper layer;
   wherein the first honeycomb layer, the second honeycomb layer, and the third honeycomb layer are aligned such that the first direction, the second direction, and the third direction are similar.

* * * * *